Nov. 26, 1946.  L. B. HAIGH  2,411,540
ELECTRICALLY OPERATED CALCULATING EQUIPMENT
Filed July 12, 1943   7 Sheets-Sheet 1

INVENTOR.
LESLIE B. HAIGH
BY
ATTORNEY

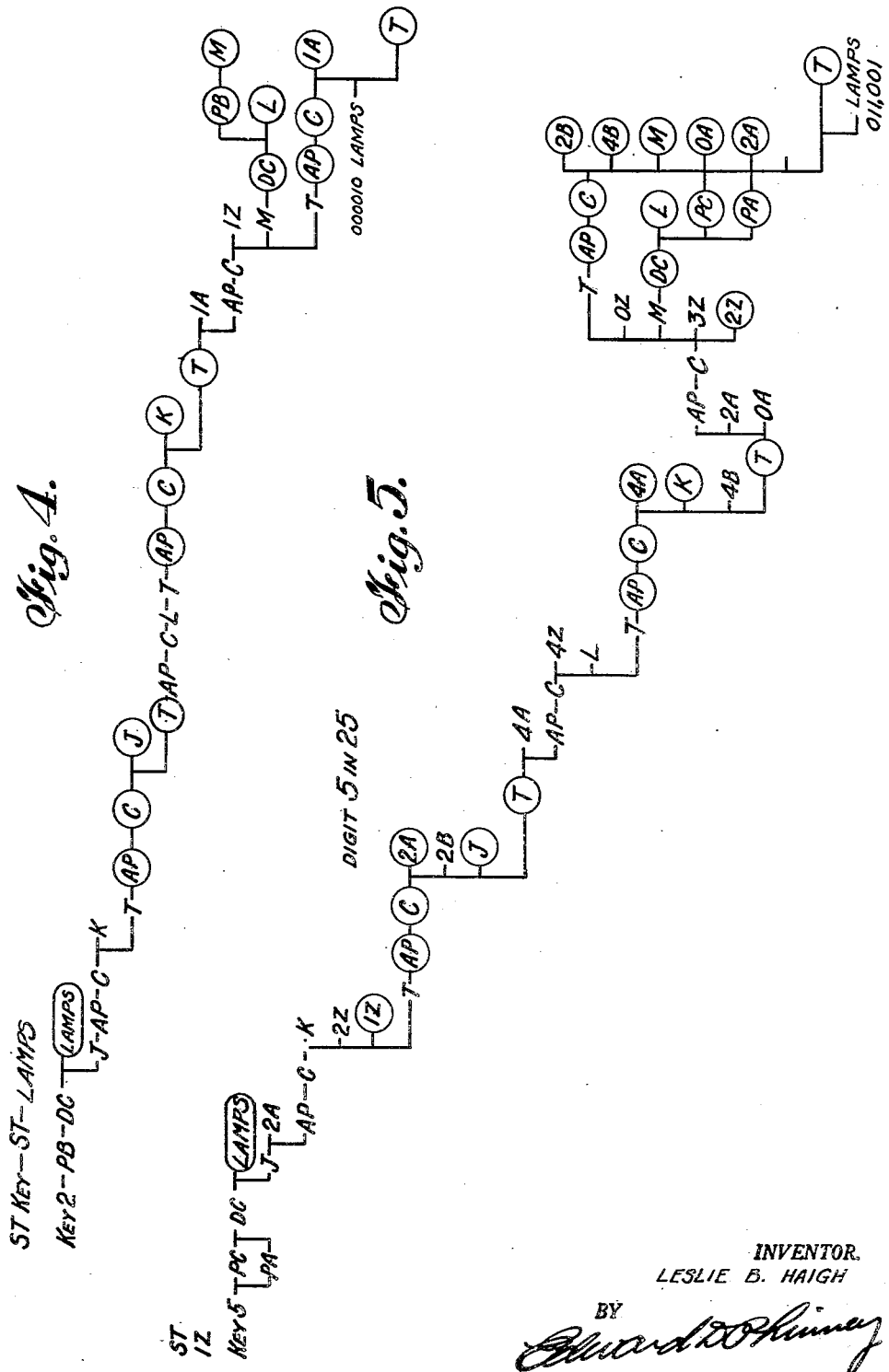

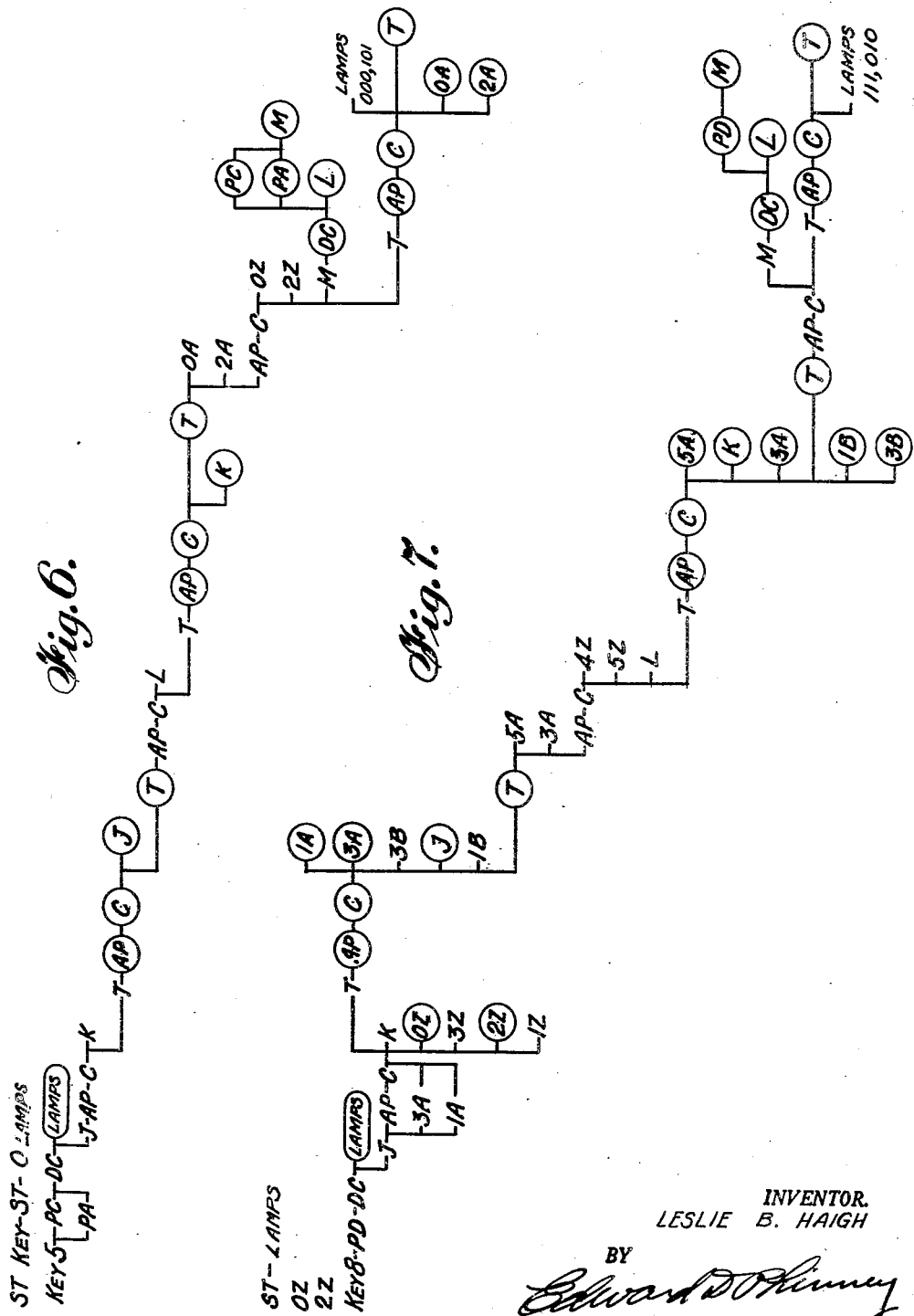

Fig. 9.

Nov. 26, 1946. L. B. HAIGH 2,411,540
ELECTRICALLY OPERATED CALCULATING EQUIPMENT
Filed July 12, 1943 7 Sheets-Sheet 6

INVENTOR.
LESLIE B. HAIGH
BY
ATTORNEY

Patented Nov. 26, 1946

2,411,540

UNITED STATES PATENT OFFICE 2,411,540

ELECTRICALLY OPERATED CALCULATING EQUIPMENT

Leslie Baines Haigh, West Orange, N. J., assignor to Standard Telephones and Cables Limited, London, England, a British company Application July 12, 1943, Serial No. 494,281
In Great Britain June 6, 1941

6 Claims. (Cl. 235—61)

This invention relates to calculating equipment.

Electrically operated calculating equipment in which the calculations are performed in radix two has been described in the applications of Hartley et al., filed July 12, 1943, Serial No. 492,282, and Hartley et al., June 24, 1943, Serial No. 492,060.

The present invention relates to means for converting numbers expressed in a first radix into equivalent numbers expressed in a second radix.

The object of the invention is to receive information in the decimal system or radix ten and translate this information one digit at a time into a radix two system.

Another object is for this system to operate in connection with another system for further calculations, such as that disclosed in the application of Hartley et al. 52—36—7, filed July 12, 1943, Ser. No. 494,282, and the information can be transmitted to the second system either by means of manually operated keys to set up a number in the radix two system or it may be transmitted from contacts and relays.

Another object is to provide a system which may be expanded or continued in any desired number of digits by a process similiar to that shown in the drawings.

The invention is illustrated in the accompanying drawings in which:

Fig. 1 shows a broken-down sequence chart showing just the pulsing or cycle relays AP, C, and T and their control of the sequence or progress relays J, K and L.

Fig. 2 shows a sequence chart broken-down including the relays listed in Fig. 1 and in addition the points at which certain operations take place when the first digit key is operated.

Fig. 3 shows the above relays listed in Fig. 1 and in addition the points where certain operations take place when a second or subsequent digit key has been operated.

Fig. 4 shows a complete sequence chart for the operation and release of relays for digit 2 of the number 25 used for illustration.

Fig. 5 shows the operation and release of all relays for the digit 5 in the illustration 25.

Fig. 6 shows a sequence chart with the operation and release of all relays for the first digit 5 in the number 58 used for illustration.

Fig. 7 shows a sequence chart with the operation and release of all relays for the digit 8 in the illustration 58.

Fig. 9 shows the pulsing or cycle relays and their relation to the sequence or progress relays.

Figure 10:
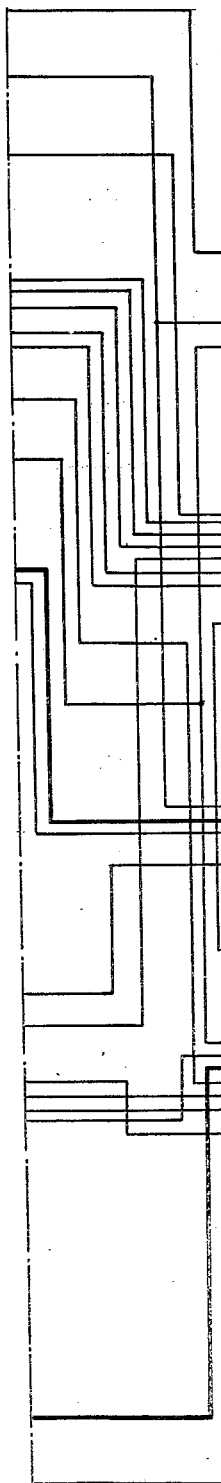
Figure 10A:
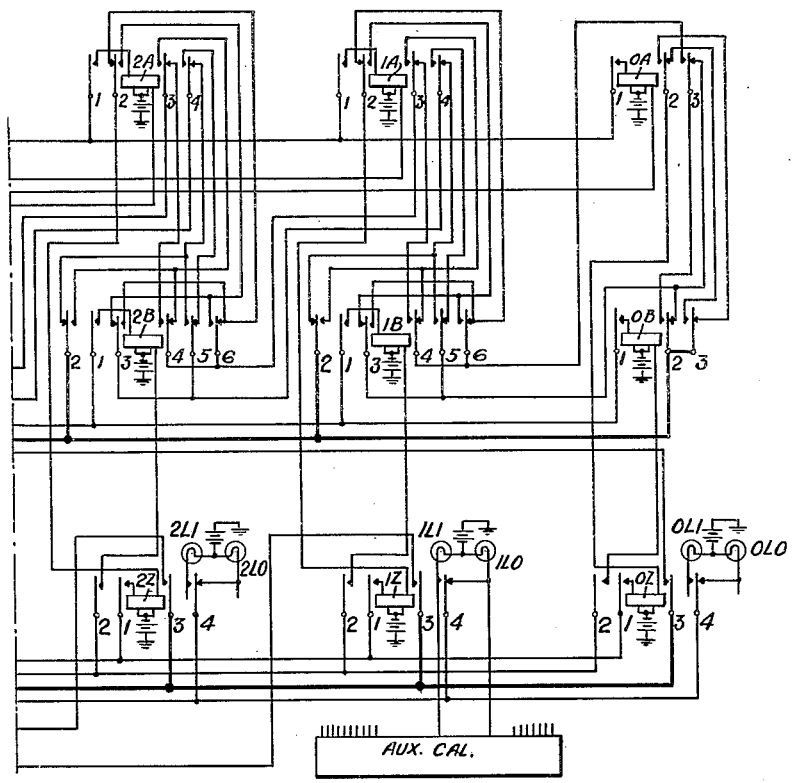

Figs. 10 and 10A, taken together, show the recording and translating relays, together with their associated lamps.

Figure 8:
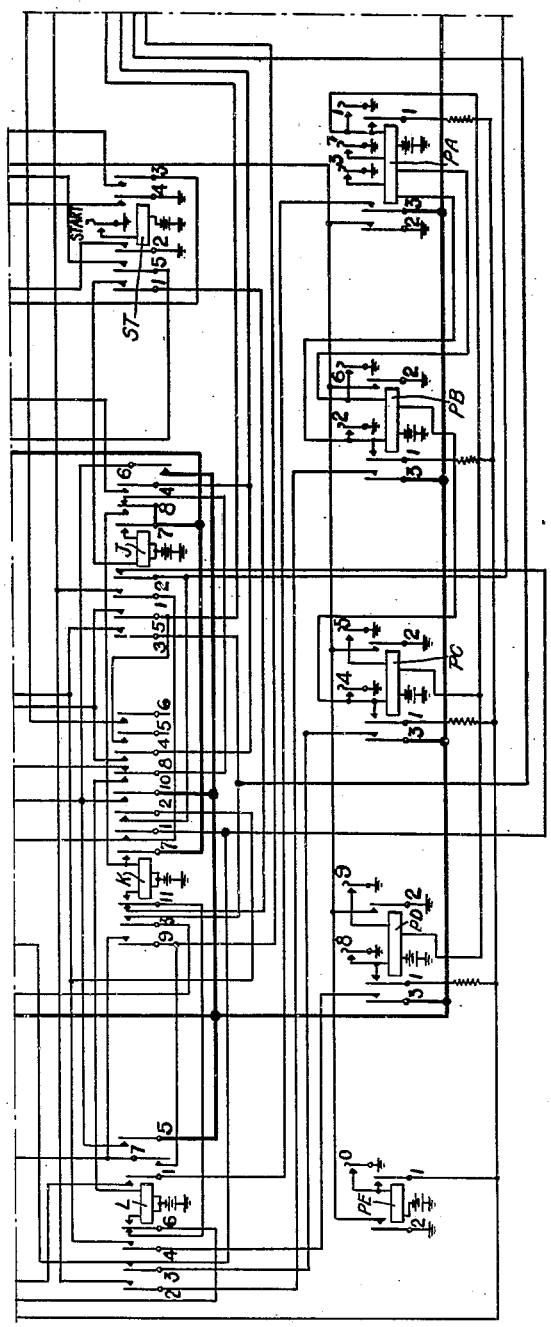
Fig. 8 shows the numerical and start keys, together with associated recording and start relays.
Figure 9:
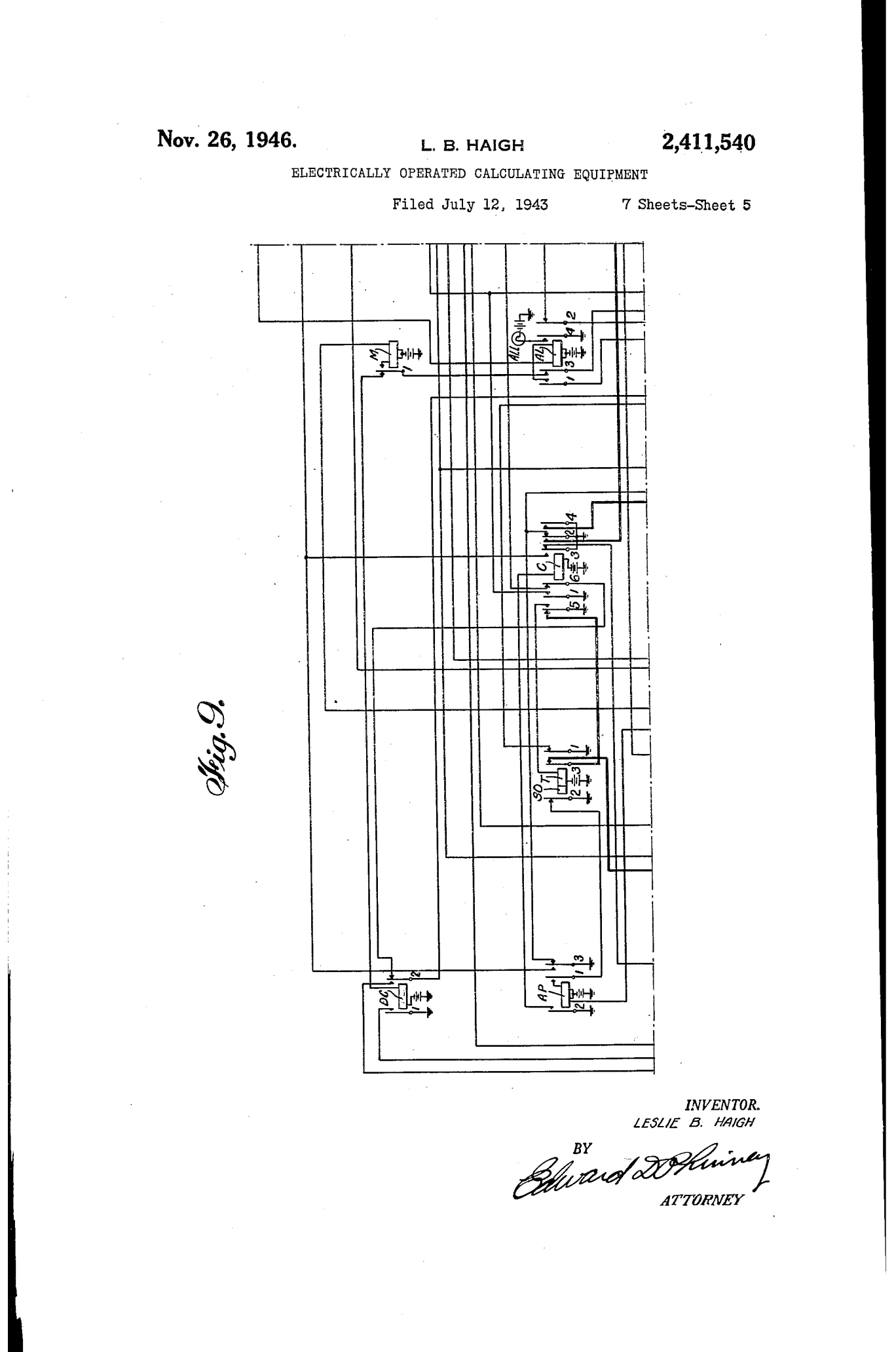

The nature of the invention will be better understood from a description of one embodiment thereof taken in conjunction with the accompanying drawings in which Figs. 8 to 10 taken together are a circuit diagram of an electrically operated calculating equipment by means of which an integral number expressed in radix ten is converted rapidly and automatically into the equivalent number expressed in radix two.

The radix of any numbering system is a number which is made the base of the system. Thus, 10 is the radix or base of the decimal system and it is therefore called the radix ten system. In the radix two system the base is 2 and hence the name "radix two."

In order to translate from the radix ten system into the radix two system the former is broken-down into twos or a multiple thereof. Also in order to place the radix two system on a decimal basis for arithmetical calculations, each time a 2 appears in the radix ten system, a 10 is substituted in the radix two system. For example, if an 8 or $2^3$ appears in the radix ten system, a $10^3$ is substituted in the radix two system. As another example, if 7 or $2^2$ plus $2^1$ plus $2^0$ is found in the radix ten system, it is translated into $10^2$ plus $10^1$ plus $10^0$ in the radix two system. In the process of addition in the radix two system, where 0 and 1 only are used, it is done as follows: 10100 added to 101 equals 11001; the process being different from the usual in that the sum of the two 1's in the hundreds column equals 2 but since 2 is not used, a zero is substituted and a 1 carried over to the thousands column.

This general method is used to facilitate the circuit design.

In the circuit shown numbers are entered into the equipment digit by digit in the usual order of descending denominational values by means of ten keys, shown in Fig. 8, one for each digital value to be entered. As each digit is submitted, the radix two equivalent of the radix ten number so far keyed is displayed on a lamp indicator (Fig. 10), whereupon another digit may be superimposed. Digits may be submitted at the rate of about three per second.

For inserting the radix ten digits, a set of ten digit keys is shown for convenience, but these can clearly be replaced by the contact pairs of coupling relays or multi-position switches arranged to connect the circuit to any kind of device which represents a digit of a radix ten number by grounding one of ten wires. The display lamps can equally clearly be replaced by contacts of a coupling relay, arranged to connect the circuit at the desired moment to any kind of radix two storing or indicating device, which is designed to operate from a potential on one of two wires in each denomination.

Calculator or translator

The calculator is a straightforward accumulator arranged for the addition of numbers in radix two, as described in the above mentioned Hartley et al. application, filed July 12, 1943, Serial No. 494,282, and may be extended for as many denominations in radix two as may be required for the radix ten numbers which are to be converted, i. e., seven denominations for two digit numbers, ten for three, fourteen for four, etc.

In each denomination (except the highest, $2^N$), there is a "new factor" relay A, an "aggregate" relay Z and an "aggregate-retaining" relay B. The operated condition of any of these relays represents the value 1 in the denomination concerned, and the unoperated condition represents the value 0. A new factor is added in two stages to an aggregate already registered by the Z relays. First, the old aggregate is transferred from the Z to the B relays, and the new factor is entered on the A relays. Second, the holding circuit of the Z relays is opened and the latter immediately re-operate in a new combination representing the sum of the numbers registered by the A and B relays, and the new aggregate may then be displayed on the lamps.

Principle of conversion of multi-digit radix ten numbers into radix two

The value of a digit entered in radix ten is recorded by operating a combination of the five translating relays PA—PE (Fig. 8). The combinations are so chosen that PA operated represents the value 1 in denomination $2^0$ of a radix two number, PB the value 1 in denomination $2^1$, PC the value 1 in denomination $2^2$, and PD the value 1 in denomination $2^3$, while PE operated represents the value 0 in all the four denominations. The five relays are connected to the ten keys in accordance with the following table, from which it will appear that the set of relays constitutes a device for translating any single digit in radix ten directly into the equivalent radix two number.

| Radix ten digit | Translating relays operated | | | | | Equivalent radix two number |
|---|---|---|---|---|---|---|
| 0 | PE | | | | | 0000 |
| 1 | | | | | PA | 0001 |
| 2 | | | | PB | | 0010 |
| 3 | | | | PB | PA | 0011 |
| 4 | | | PC | | | 0100 |
| 5 | | | PC | | PA | 0101 |
| 6 | | | PC | PB | | 0110 |
| 7 | | | PC | PB | PA | 0111 |
| 8 | | PD | | | | 1000 |
| 9 | | PD | | | PA | 1001 |

As soon as the first digit of a radix ten number to be converted is keyed, the equivalent radix two number is entered from contacts of the translating relays into the calculator, stored therein, and displayed. The second digit of the radix ten number is then keyed and calculation begins.

Considered in radix ten, the keying of this second digit implies that the number so far submitted has become, by that keying action, a two-digit number with the first digit transferred from denomination $10^0$, which it previously occupied to denomination $10^1$, and the second digit placed in denomination $10^0$, i. e., a number having a total value equal to ten times the value of its first digit, plus the value of its second digit. Now the equivalent in radix two of the radix ten number 10 is the number 1010

(since, in radix ten, $10 = 8+2 = 2^3+2^1$)

It follows, therefore, that the radix two equivalent of the two-digit radix ten number keyed is equal to 1010 times (computed in radix two) the radix two equivalent of the first digit keyed, plus the radix two equivalent of the second digit keyed.

The following information gives the arithmetical calculations for the illustration 25 in simplified and complete form:

Key 2 is operated in the decimal or radix ten system. In the radix two system, as explained above, this digit 2 is translated into 10 and if no other key is operated this digit has been completed and is displayed on lamps as 10 with certain zeros in front which have no significance.

Key 5 or the second digit is then operated in the decimal or radix ten system and the total of 25 is broken down into 2 times 10 plus 5. The substitution of 10 in the radix two system for 2 in the radix ten system was described above. 10 in the radix ten system is broken down into 8 plus 2 or $2^3$ plus $2^1$ in the decimal system and then in the radix two system, 10 being substituted for the 2's, it equals $10^3$ plus $10^1$ or 1000 plus 10 or 1010. The 5 in the decimal system is broken down into 4 plus 1 or $2^2$ plus $2^0$. In the radix two system, since 10's are substituted for the 2's, this is translated into $10^2$ plus $10^0$ or 100 plus 1 which equals 101. Therefore, from the above calculations, for the final answer in radix two we have $10 \times 1010$ plus 101, which equals 11001. The lamps corresponding to the 1's would then be lighted and the numbers indicated with two zeros in front which have no significance.

Detailed circuit operation

Before starting the detailed operation of the circuit it will clarify the operation if the sequence charts shown in Figs. 1 to 3 are reviewed first. This will give a broad picture as to what to expect in the detailed operation. For the first digit as shown in Fig. 2, the pulsing and progress relays do a lot of operating and releasing without any apparent useful purpose. Certain cycles of these relays are required for the calculation of the second and sub-subsequent digits. The relays are allowed to go through the same cycles for the first digit to avoid circuit complication. The sequence charts shown in Figs. 4 to 7 indicate the same sequence as the detailed operation. They may be referred to either with the detailed operation or separately.

It is supposed that an operator desires to obtain the radix two equivalent of the radix ten number 25. To place the circuit in operation, the operator throws the locking key "start" and ST operates.

Lamps NL0, 5L0, 4L0, 3L0, 2L0, 1L0 and 0L0 burn in a circuit to ST2 and display the radix 2 number 0000000. The circuit can be traced to the zero lamps through 0Z4 to 5Z4 back C6, DC2 back and ST2. The operator depresses key 2 and PB operates. DC operates to PB2 and number display ceases, open at DC2. PB locks over DC2 to ST2. J operates over ST1, K11 back and L6 back to DC1.

AP operates over J6, T3 and C5 back and locks over AP1 to T2. C operates to AP2. J locks to C4. K operates over J3 front to C4 and locks over both K11 through L6 back and K7 to DC1 and C4 respectively. T operates slowly to C5.

AP, open at T2, releases. C, open at AP2, releases. J, open at C4 and K11, releases. T, open at C5, releases.

AP operates K10, T3 and C5 back and locks to T2, followed by C to AP2. K again locks to C4. L operates over K8 front and J8 back to C4 and locks over L6 to DC1. T operates slowly to C5.

AP, open at T2, releases, followed by C. K, open at C4 and L6, releases. T, open at C5, releases. 1A operates over L2, PB3 and T3 to C5 and locks over 1A1 and ST3 to T1. This transfers the record from the key relays to the A relays.

AP operates over L5, T3 and C5 and locks over AP1 to T2, followed by C to AP2. 1Z operates over 1A2 front, 1B3 back, 0B2 back to C2 front. This transfers the record from the A relays to the Z relays. M operates over K8 back, J8 back to C4 and locks over M1, AL3 to PB2. T operates to C5, slowly enough to allow 1Z time to operate. DC, open at M1, releases. L, open at DC1, releases. PB, open at DC2, releases as soon as key 2 is allowed by the operator to restore.

AP, open at T2, releases, followed by C. 1Z locks through AL2, ST5 to AP3 back. M, open at C4 and PB2 releases as soon as PB has released. 1A, open at C1, releases. T releases at C5.

Lamps NL0, 5L0, 4L0, 3L0, 2L0, 1L1, 0L0 burn in a circuit to C6, DC2 back, ST2 and display the radix two number 0000010, the equivalent of the radix ten number 2. At this stage ST and the aggregate relay 1Z alone remain operated.

The operator depresses key 5 and PC and PA operate. DC operates over M1 back, AL to PC2 and PA2, and number display ceases, open at DC2 to ST2. PC and PA lock over DC2. J operates over ST1, K11 back, L6 back to DC1. 2A operates over J2, 1Z3, T3 and C5 and locks over 2A1 through ST3 to T1. This transfers the record from the Z relays to the next column in the A relays which is part of the calculation.

AP operates over J6, T3, C5 and locks over AP1 to T2, followed by C to AP2. 1Z, open at C2 back and AP back, releases. 2Z operates over 2A2 front, 2B3 back, 1A4 back, 1B2 back to C2 front. J locks to C4. K operates over J8 front to C4 and locks over K11 front, L6 back to DC1. T operates to C5, slowly enough to allow 2Z time to operate.

AP, open at T2, releases, followed by C at AP2. 2Z locks through AL2, ST5, C2 back and to AP3 back. 2A, open at C1, releases. 2B operates over 2Z2 and K9 to C3 back. J, open at C4, releases. T, open at C5, releases. 4A operates over K3, 2Z3, T3 to C5 and locks over 4A1, ST3 and T1.

AP operates over K10, T3 and C5 and locks over AP1 to T2, followed by C at AP2. 2B locks to AP3 front over 2B1. 2Z, although open at C2 back, holds (or releases and re-operates) to C2 front over 1B2 back, 1A4 back, 2B3 front and 2A2 back. 4Z also operates over 4A2 front, 4B3 back, 3A4 back, 3B2 back to C2 front. K locks to C4 over K7. L operates over K8 front, J8 back to C4 and locks over L6 to DC1. T operates to C5, slowly enough to allow 2Z and 4Z time to operate.

AP, open at T2, releases, followed by C at AP2.

2Z and 4Z lock to AP3 back through AL2 and ST5. 4A, open at C1 and T1, releases. 2B, although open at C3 front, holds (or releases and re-operates) to C3 back over L7 and 2Z2. 4B operates to C3 back over 4Z2 and L7. K, open at C4, releases. T, open at C5, releases. 0A operates over L1, PA3, T3 and C5 and locks over 0A1 and ST3 to T1. 2A operates over L3, PC3, T3 and C5 and locks to 2A1, ST3 and T1. This transfers the record from the key relays to the A relays.

AP operates over L5, T3 and C5 and locks over AP1 to T2, followed by C at AP2. 0Z operates 0A2 front, 0B3 back, and C2 front. 3Z operates over 3A2 back, 3B6 back, 2A3 front, 2B2 front, to C2.

2Z releases at AP3 back and C2 back. The sum of 1, represented by 2A operated, and 1, represented by 2B operated, is 10 in radix two. The value 0 in denomination $2^2$ is thus correctly recorded by the release of 2Z, and 1 is "carried over" to the next higher denomination $2^3$ and recorded, since neither 3A nor 3B is operated, by the operation of 3Z, as stated.

M operates over K8 back, J8 back to C4 and locks through M1 front, AL3 and PA2. T operates to C5, slowly enough to allow 0Z, 3Z time to operate. DC, open at M1, releases. L, open at DC1, releases. PC and PA, open at DC2, release as soon as key 5 is allowed by the operator to restore.

AP, open at T2, releases, followed by C at AP2. 0Z, 3Z and 4Z lock to AP3 back. M, open at C4, releases as soon as PC and PA have released. 0A and 2A, and 4A, open at C1, release. T releases at C5. 2B and 4B, open at C3, release.

Lamps NL0, 5L0, 4L1 and 3L1, 2L0, 1L0 and 0L1 burn in a circuit to C6 and display the radix two number 0011001, the desired equivalent of the radix ten number 25. At this stage, ST and the aggregate relays 0Z, 3Z and 4Z alone remain operated.

The operator, having submitted the complete radix ten number and read the computed equivalent radix two number, restores key "start"; ST, 0Z, 3Z and 4Z release and display ceases. The circuit is again in its original condition.

It is to be observed that any combination of digits that has been entered by means of the digit keys appears finally as a number in radix two on the Z relays. Each time a digit key is depressed, one or more of the translating relays PA—PE operate, followed by DC and J, and that thereafter the three relays AP, C and T operate and release in turn three times in self-timing circuits and independently of the A, B and Z relays; and that K, L and M serve to count the three cycles of AP, C and T. Each time C is operated calculation takes place, the Z relays operating in a combination determined solely by the conditions of the A and B relays.

The immediate result of the operation of a digit key, following operation of relays D, C and J, is to cause the number stored on the Z relays to be multiplied by 10 in radix two and the product to be recorded on the A relays. The first operation of relay C causes this to be transferred to the Z relays by means of the circuits or adding the number recorded on the A relays to the number recorded on the Z relays, the latter being zero at the present stage. The following is an illustration in which an operator desires to obtain the radix two equivalent of the radix ten number 58. The first digit 5 is broken down into $4+1$ or $2^2$ plus $2^0$. In the radix two system the equivalent is $10^2$ plus $10^0$, or 100 plus 1 which equals 101. The total 58 is broken down into 5 times 10 plus 8. In the decimal system the 10 is broken down into 8 plus 2 or $2^3$ plus $2^1$. In the radix two system this is translated into $10^3$ plus $10^1$, or 1000 plus 10, which equals 1010. In the radix ten system the digit 8 is broken down into $2^3$ which translated into radix two system is equal to $10^3$ or 1000. Therefore we have 101 times 1010 plus 1000 or at total of 111,010.

The following is a detailed operation of the circuit for the illustration of the radix ten number 58. The start key is operated and it operates relay ST. This lights the zero lamp for each digit shown on the circuit. The circuit can be traced through C6, DC2 back, to ST2. Key 5 is operated and operates PC and PA relays. Relay DC operates through M1 back, A13, to PA2 and PC2. This extinguishes the lamps at DC2 back. J operates through ST1, K11 back, L6 back to DC1. AP operates through J6, T3 to C5 back and locks to AP1 and T2. C operates at AP2. K operates at J8 front and C4. T operates slowly at C5. AP releases at T3. C releases at AP2. J releases at C4. T releases at C5 front. AP operates through K10, T3 to C5 back and locks through AP1 to T2. C operates at AP2. L operates through K8 front, J8 back and C4. T operates at C5 front. AP releases at T2. C releases at AP2. K releases at C4, T releases at C5 front. 0A operates through L1, PA3, T3 and C5 back. 2A operates through L3, PC3, T3 and C5 back. This transfers the record from the key relays to the A relays. AP operates through L5, T3 and C5 back. C operates at AP2. 0Z operates through 0A2 front, 0B3 back, C2 front. 2Z operates over 2A2 front, 2B3 back, 1A4 back, 1B2 back, C2 front. M operates over K3 back, J3 back and C4. DC releases at M1 back. T operates at C5 front. L releases at DC1. PA and PC release at DC2. AP releases at T2. M releases at PA2 and PC2. C releases at AP2. 0A and 2A release at C1 front. T releases at C5. This lights lamps 000101. This represents the radix two equivalent of the digit 5.

The following is the detailed operation for digit 8 in the illustration 58.

The relays left operated from the above operation are ST, 0Z and 2Z. Key 8 is operated and it operates relay PD which locks through PD1 to DC2 front. DC operates through M1 back, AL3 and PD2. J operates through ST1, K6 back, L6 back and DC1. AP operates through J6, T3 and C5 back. 3A operates through J3, 2Z3, T3 and C5 back. 1A operates through J1, 0Z3, T3 and C5 back. This transfers the record from the previously operated Z relays to the next column to the A relays. C operates to AP2. K operates through J8 front and C4. 0Z and 2Z release at C2 back. 1Z operates through 1A2 front, 1B3 back, 0B2 back and C2 front. 3Z operates 3A2 front, 3B3 back, 2A4 back, 2B2 back, and C2 front. This transfers the record from the A relays to the Z relays. T operates at C5 front. AP releases at T2. C releases at AP2. 1A and 3A release at T1 and C1. 3B operates through 3Z2 to K9 and C3 back. J releases at C4. 1B operates through 1Z2, K9 and 3C back. T releases at C5. 3A operates through K2, 1Z3, T3, to C5 back. 5A operates through K4, 3Z3, T3 to C5 back. AP operates through K10, T3 and C5 back. C operates at AP2. 4Z operates through 4A2 back, 4B6 back, 3A3 front, 3B2 front and C2 front. 5Z operates through 5A2 front, 5B3 back, 4A4 back, 4B2 back to C2 front. L operates through K8 front and J8 front and C4. T operates through C5 front. AP releases at T2. C releases at AP2. 3A and 5A release at C1 and T1. 1B and 3B release at C3 front and AP3 front. K releases at C4. AP operates through L5, T3 and C5 back. T releases at C5 front. C operates at AP2. M operates through K8 back, J8 back and C4. DC releases at M1 back. T operates at C5 front. PD releases at DC2 front. L releases at DC1. AP releases at T2. M releases at PD. C releases at AP2. T releases at C5 front. This leaves relays 5Z, 4Z, 3Z and 1Z operated. This lights the final lamps for the combination of digits 5 and 8 and is indicated at 111,010.

It has been shown that when 2A and 2B are both operated, 1 is "carried over" to the next higher denomination. The calculator, in fact, effects "carry over" automatically in all circumstances, without introducing any delay in the operation of the Z relays.

In denomination $2^0$, it will be observed that 0Z operates if 0A or 0B is operated, but not if both are operated. In the latter case (only), the front contact of 0A3 is grounded and 1 is carried over to denomination $2^1$. If 0A or 0B or neither is operated, the back contact of 0A3 is grounded and 0 is carried over to denomination $2^1$.

In denomination $2^1$, 1Z operates if either 0 is carried over from denomination $2^0$ and 1A or 1B is operated alone, or 1 is carried over from denomination $2^0$ and 1A and 1B are both operated or both unoperated. The armature of 1A3 is grounded and 1 is carried over to denomination $2^2$ if either 1A and 1B are both operated (whether or not 1 has been carried over from denomination $2^0$) or 1 is carried over from denomination $2^0$ and 1A or 1B is operated alone. The armature of 1A4 is grounded and 0 is carried over to denomination $2^2$ if either 1A and 1B are both unoperated or 0 is carried over from denomination $2^0$ and 1A or 1B is operated alone.

In all other intermediate denominations, the conditions for operating the Z relay and for carrying 1 or 0 over to the next higher denomination are the same as in denomination $2^1$.

In denomination $2^N$, i. e., the highest denomination for which provision is made, there is no A relay. NZ operates if either 0 is carried over from the next lower denomination $2^{N-1}$ and NB is operated or if 1 is carried over and NB is unoperated. The front contact of NB2 is grounded and 1 is carried over to a denomination not provided for, if 1 is carried over from denomination $2^{N-1}$ and NB is operated. In the latter event, AL operates and locks to AL1; the operated Z relays, open at AL2, release; DC, open at AL3, releases; and the radix two number 0 is displayed, indicating that the capacity of the calculator has been exceeded. This condition persists until key "start" is restored.

What is claimed is:

1. Calculating equipment comprising means for entering thereinto by successive digits an integral number expressed in a first radix, electrically operated means for transforming each of a succession of digits of said number in turn, as it is entered, commencing with the digit of highest denomination, into the equivalent number in a second radix as if said digit were of lowest denomination, and means including said electrically operated means, effective upon entry of each digit of lower denomination, for computing a number in said second radix equivalent to the value of preceding digit or digits raised to the next higher denomination in said first radix and for adding to the result of said computation the number expressed in said second radix which is equivalent to the value of the lower denomination of said number expressed in said first radix.

2. Calculating equipment comprising means for entering thereinto by successive digits an integral number expressed in a first radix, electrically operated means for transforming the digit of highest denomination of said number upon entry thereof into its equivalent in a second radix, means effective upon entry of a digit of next lower denomination for multiplying said equivalent by the value of said first radix expressed in said second radix, and for adding to the product the equivalent in said second radix of said digit of next lower denomination of said first mentioned number, and means for rendering available the number which is the result of said addition.

3. Calculating equipment as claimed in claim 2 in which said first radix is ten and said second radix is two.

4. Calculating equipment comprising means for entering thereinto digit by digit commencing with the digit of highest denomination an integral number expressed in a first radix, means automatically responsive to the entry of each digit for converting said digit into its equivalent in a second radix, for multiplying the equivalent in said second radix of any combination of digits of said number previously entered by the value of said first radix expressed in said second radix and for adding to the product the equivalent in said second radix of the digit last entered, and means for rendering available the number which is the result of said addition.

5. A calculating apparatus for translating a number expressed in radix ten into a number expressed in radix two, comprising a plurality of input wires, there being one for each digit from zero to nine, means to enter the successive digits of a number expressed in radix ten into said apparatus by altering in sequence the circuit conditions of a combination of said input wires, a plurality of output wires, and means operatively controlled by the circuit conditions of said input wires and comprised solely of relays and contacts operated thereby for altering upon entry of each successive digit, the circuit condition of a combination of said output wires in accordance with the equivalent expressed in radix two of the number expressed in radix ten which has been entered into said apparatus.

6. A calculating apparatus, as defined in claim 5, in which the means for altering the circuit condition of a combination of the output wires includes a plurality of storage relays which operate when the next succeeding digit is entered into said apparatus and which cooperate to calculate the equivalent in radix two of the digit in that denomination plus the radix two equivalent of any preceding denominations.

LESLIE BAINES HAIGH.